United States Patent [19]

Kime et al.

[11] 3,714,593

[45] Jan. 30, 1973

[54] SYNCHRONOUS DEMODULATOR HAVING AN IMPROVED DRIVING CIRCUIT

[75] Inventors: Robert Clarence Kime, Fairview Park; Warren Frederick Miller, Euclid, both of Ohio

[73] Assignee: Keithley Instruments Inc., Solon, Ohio

[22] Filed: Nov. 24, 1971

[21] Appl. No.: 201,691

[52] U.S. Cl. ....................329/50, 324/57 R, 328/134, 329/103, 329/110

[51] Int. Cl. ............................H03d 3/02, H03d 3/18

[58] Field of Search ........329/50, 103, 110; 328/134; 324/57 R

[56] References Cited

UNITED STATES PATENTS

| | | | |
|---|---|---|---|
| 2,878,448 | 3/1959 | Maxey | 328/134 X |
| 3,044,020 | 7/1962 | Russell | 329/50 X |
| 3,312,780 | 4/1967 | Hurst et al. | 328/134 X |
| 3,478,178 | 11/1969 | Grace | 328/134 X |

*Primary Examiner*—Alfred L. Brody
*Attorney*—Yount & Tarolli

[57] ABSTRACT

A driving circuit is disclosed for a synchronous demodulator having first and second actuatable switching means, such as field effect transistors, which are to be alternately actuated by the driving circuit at a reference frequency for purposes of demodulating an A.C. signal containing noise and a signal of interest. The driving circuit serves to receive a reference signal at the reference frequency and to provide therefrom first and second drive signals displaced in phase by 180° for alternately actuating the first and second switching means. The phase relationship between the drive signals and the reference signal is varied independently of variations in the reference frequency. This is accomplished with circuitry which serves to provide a ramp signal which varies from a first level toward a second level in synchronism with the reference frequency, and to provide an output pulse whenever the ramp signal attains a threshold level. The threshold level is adjustable to vary the phase relationship between the output signal pulse and the reference signal.

14 Claims, 3 Drawing Figures

INVENTORS
ROBERT C. KIME
WARREN F. MILLER
BY Yount and Tarolli
ATTORNEYS

Patented Jan. 30, 1973 3,714,593

2 Sheets-Sheet 2

INVENTORS
ROBERT C. KIME
WARREN F. MILLER
BY Yount and Tarolli
ATTORNEYS

SYNCHRONOUS DEMODULATOR HAVING AN IMPROVED DRIVING CIRCUIT

This invention relates to the art of synchronous demodulators and, more particularly, to a synchronous demodulator having an improved drive circuit.

Synchronous demodulator circuits are well known and, in general, serve the purpose of receiving an AC signal which contains a signal of interest together with noise, and a reference signal exhibiting a frequency equal to that of the signal of interest and providing a DC output signal having a magnitude proportional to the signal of interest. Typically, such a demodulator includes a pair of switching devices, such as field effect transistors or the like, which are alternately actuated at the reference frequency. Synchronous demodulators may be used in various applications, such as where a signal generator is employed for applying an AC signal to an experiment so that the output AC signal from the experiment contains noise as well as the signal of interest, which may be changed in amplitude and phase from that of the generated signal. The output AC signal is applied to the synchronous demodulator together reference signal of the same frequency as that obtained from the signal generator so that a D C output signal is obtained having a magnitude representative of the magnitude of the signal of interest. Since the signal of interest may be shifted in phase from that of the generated signal, it is desirable that the reference signal applied to the demodulator be shifted in phase by a like amount so that the output DC signal will be accurately representative of the magnitude of the signal of interest.

The primary object of the present invention is to provide an improved driving circuit for a synchronous demodulator wherein the driving circuit includes improved means for shifting the phase of the drive signals to match any phase shift of the signal of interest.

It is a still further object of the present invention to provide an improved driving circuit which employs circuitry for providing an indication as to the frequency of the signal obtained from the signal generator.

It is a still further object of the present invention to provide a driving circuit capable of internally generating drive signals which are displaced in phase by 180° independently of any phase shift.

It is a still further object of the present invention to provide an improved driving circuit which employs ramp generators for providing drive signals which are selectively shifted in phase relative to that of the signal obtained from the signal generator.

It is a still further object of the present invention to provide a driving circuit for a demodulator wherein the signal generator frequency is determined automatically for purposes of setting the slope of ramp signals used in conjunction with varying the phase of the drive signals.

The invention contemplates that the synchronous demodulator includes a pair of actuatable switching means which may take any suitable form, such as field effect transistors, to be alternately actuated by the driving circuit at the reference frequency so as to demodulate an AC signal which contains noise and a signal of interest at the reference frequency and provide therefrom a DC output signal representative of the signal of interest.

In accordance with the present invention, the driving circuit receives a reference signal at the reference frequency and serves to provide first and second drive signals which are displaced in phase by 180° at the reference frequency. These drive signals are used for alternately actuating the first and second switching means, respectively. Circuitry is provided for varying the phase relationship between the drive signals and the reference signal independently of variations in the frequency of the reference signal. This is accomplished by providing a ramp signal which varies from a first level toward a second level in synchronism with the reference signal together with means for providing an output signal pulse when the ramp signal attains a threshold level. The threshold level may be adjusted so as to thereby vary the phase relationship between the output signal pulse and the reference signal.

In accordance with a more limited aspect of the present invention, a frequency measuring circuit serves to provide an output indication as to the frequency of the reference signal.

In accordance with a still further aspect of the present invention the ramp signal providing means includes an integrating circuit having a capacitor which is charged at a rate dependent upon the frequency of the reference signal.

In accordance with a still further aspect of the present invention, a frequency to voltage conversion circuit provides an output DC voltage having a magnitude dependent on the frequency of the reference signal with the voltage signal being used to control the rate of charging of an integrating capacitor employed by the ramp signal providing means.

The foregoing and other objects and advantages of the invention will become more readily appreciated from the following description of the preferred embodiment of the invention taken in conjunction with the accompanying drawings, which are a part hereof, and wherein.

Figure 1:
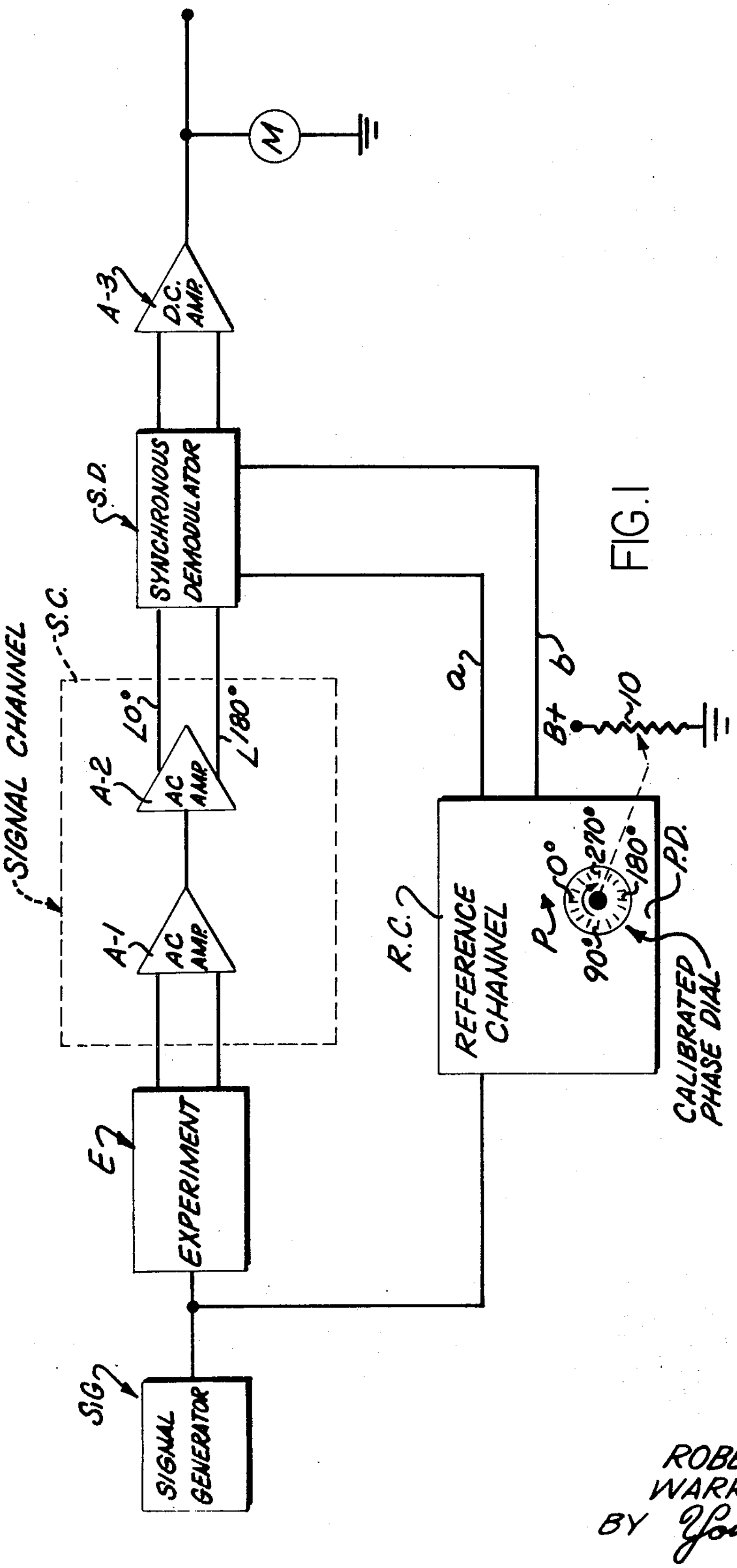
FIG. 1 is a block diagram illustration of the synchronous demodulator.

Referring now to the drawings wherein the showings are for purposes of illustrating a preferred embodiment of the invention only and not for purposes of limiting same, FIG. 1 illustrates a signal generator SG which serves to provide an alternating current reference signal. The signal generator may take various forms, such as an oscillator chopper or mechanical switch. In any case, a reference signal is developed and is applied to both the experiment E as well as to a reference channel RC. Various experiments may be undertaken, particularly those requiring low noise wide band amplification. For example, the experiment may be for detecting small changes in temperature with the use of a Wheatstone bridge to which an AC signal is applied with the output AC signal from the experiment including the signal of interest together with noise. The AC output signal from the experiment is applied to the signal channel SC for the synchronous demodulator. This signal channel includes a differential input AC amplifier A–1 having its output applied to the input of a differential output AC amplifier A–2, which provides two 180° out of phase output signals which are DC coupled to the synchronous demodulator SD. The reference signal from the signal generator SG is also applied to a reference channel RC which includes a driving circuit for providing first and second output signals displaced in phase by 180° and exhibiting a frequency equal to that of the reference signal frequency. These drive signals are applied to a pair of switching devices, in the form of field effect transistors, in the synchronous demodulator for purposes of demodulating the AC signal taken from amplifier A–2 to obtain pulsating DC signals which are amplified and filtered by a DC amplifier A–3 and applied across a suitable voltmeter M. When the drive signals are in phase with the signal of interest a maximum reading is obtained across meter M.

In accordance with the present invention, the reference channel RC is provided with a calibrated phase dial which may take various forms, such as that shown in the simplified illustration of FIG. 1. Here, the phase dial PD has a calibrated face in terms of degrees of phase displacement read in conjunction with a pointer P. The dial is mechanically connected, for example, to the wiper arm of a potentiometer 10 located in the drive circuit, to be described in greater detail hereinafter relative to FIGS. 2 and 3. As the phase dial PD is rotated the wiper arm is displaced and the drive circuit serves to vary the phase of the drive signals on output circuits *a* and *b* relative to that of the reference signal obtained from the signal generator. When the thus phase displaced drive signals are in phase with the signal of interest applied to the synchronous detector SD, a maximum reading is obtained from meter M. A visual inspection of the position of the calibrated phase dial PD relative to point P indicates the degree of phase displacement of the drive signals and, hence, of the signal of interest, relative to the reference signal provided by the signal generator SG. Consequently, this circuit provides the user with an output indication of the magnitude of the signal of interest as well as its phase displacement. Having briefly described this system as depicted in FIG. 1 and its mode of operation, attention is now directed to the following description relative to FIGS. 2 and 3 which deal particularly with the drive circuit included in the reference channel RC.

The reference channel serves to receive the reference signal $V_R$, taken from the signal generator. This signal is an alternating signal and its frequency may not be known by the user. The reference signal $V_R$ is applied to a zero crossing detector 20, of conventional design, which serves to provide an output pulse each time the alternating reference signal $V_R$ crosses a particular level. Preferably, an output pulse P1, P2, etc. is generated each time the reference signal $V_R$ crosses ground potential while it is increasing in a positive direction. Output pulses P1, P2, etc., are applied to a linear ramp generator RG–1 as well as to a frequency to voltage converter 22, of conventional design. The frequency to voltage converter 22 serves to provide a DC output signal V having a magnitude proportional to the frequency of pulses P1, P2 and, hence, of the reference signal $V_R$. So that the user may have a visual indication as to the frequency of reference signal $V_R$ a suitable frequency meter 24 may be employed. While meter 24 is illustrated as being a separate instrument from that of meter M, it is preferred that in a commercial version of the invention that suitable switching circuits be provided so that in one switch position meter M serves to provide an output indication as to the magnitude of the signal of interest, and in a second switch position meter M provides an indication as to the frequency of the reference signal.

Ramp generator RG–1 serves to provide a linear ramp signal RS–1 which varies from a first level L–1 toward a second level L–2 in synchronism with the reference frequency. Preferably, the ramp signal increases uniformly from level L–1 upon receipt of each pulse P1, P2, etc., toward the second level L–2 in synchronism with the reference frequency. This ramp signal RS–1 is applied to a level detector LD–1 having a second input connected to the wiper arm of potentiometer 10. The wiper arm of potentiometer 10 serves to adjust the threshold level for the level detector LD–1. Each time ramp signal RS–1 exceeds the threshold level TL an output signal pulse is provided on the output circuit of the level detector. Consequently, by turning the calibrated phase dial PD (see FIG. 1) the threshold level TL may be varied and, hence, the phase displacement of the output signal pulse obtained from the level detector LD–1 may be adjusted relative to the reference frequency.

Each time an output pulse is obtained from level detector LD–1 the pulse is applied to a second ramp generator RG–2, constructed in the same fashion as ramp generator RG–1. The second ramp generator serves to provide a second ramp signal RS–2, the commencement of which is displaced in phase from signal RS–1 in dependence upon the adjustment of potentiometer 10. Ramp signal RS–2 is applied to a second level detector LD–2 having its second input connected to a voltage divider including a pair of resistors 24 and 26 connected between ground and a B+ voltage supply source. The values of resistors 24 and 26 are chosen so that the level detector LD–2 provides an output pulse exactly 180° after the output pulse is provided by level detector LD–2. The output signal pulses from level detectors LD–1 and LD–2 are respectively applied to the set and reset inputs of a conventional R/S flip-flop 28. Thus, the flip-flop 28 is alternately set and reset by output pulses displaced 180° in phase at a frequency corresponding with the frequency of reference signal $V_R$. The output circuits of the R/S flip-flop serve to drive a pair of NPN transistors 30 and 32 having their emitters connected in common to a B– voltage supply source and their base electrodes connected to the two output circuits of the flip-flop. The collector of transistor 30 is connected through a resistor 34 to ground, and in a similar fashion the collector of transistor 32 is connected through a resistor 36 to ground. Consequently, transistors 30 and 32 are alternately actuated into conduction by signals which are displaced 180° in phase and at a frequency corresponding to the reference frequency $V_R$. Output circuits *a* and *b* are respectively connected to the collectors of transistors 30 and 32 for purposes of carrying the drive signals to actuate the synchronous demodulator SD.

Figure 2:
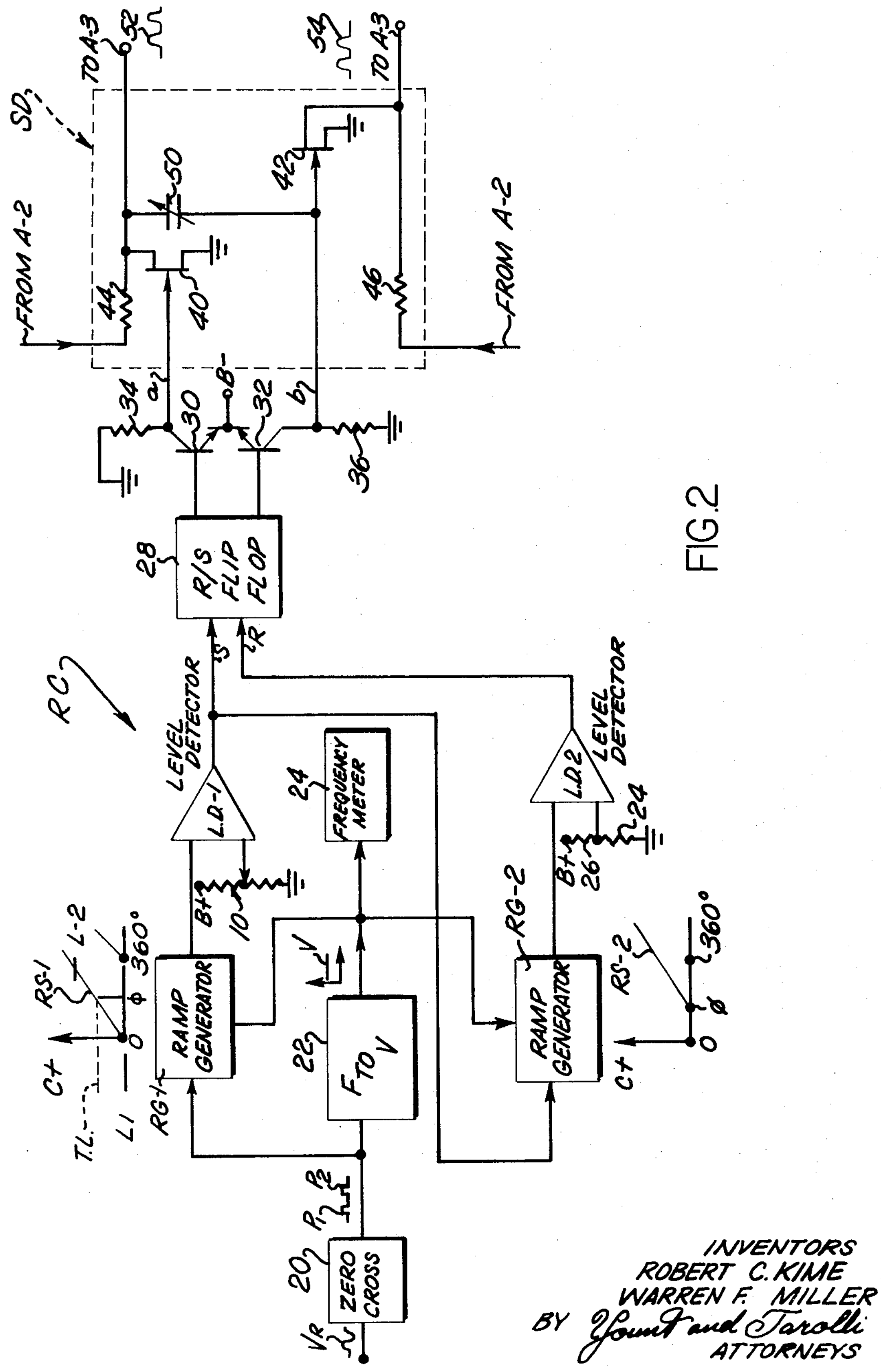
FIG. 2 is a combined block diagram-schematic illustration of the reference channel driving circuit and synchronous demodulator circuitry; and, FIG. 3 is a schematic illustration of a ramp generator employed by the driving circuit.

The synchronous demodulator SD may take various forms; however, it preferably takes the form as shown in FIG. 2, including a pair of field effect transistors 40 and 42 having their gates respectively connected to output circuits *a* and *b* of the driving circuit in the reference channel RC. The source electrodes of field effect transistors 40 and 42 are connected to ground and their drain electrodes are respectively connected through resistors 44 and 46 to the corresponding outputs of the AC amplifier A–2. A spike compensating, adjustable capacitor 50 is connected between the drain electrode of transistor 40 and the gate electrode of transistor 42 for purposes of compensating for switching spikes injected into the signal channel by the output square waves obtained from the reference channel RC. Each time transistor 30 is biased into conduction a negative forward biasing signal is applied to field effect transistor 40 and, similarly, each time transistor 32 is biased into conduction a negative forward biasing signal is applied to transistor 42. As is conventional, the synchronous demodulator SD demodulates the AC signal obtained from amplifier A–2 at the frequency that transistors 40 and 42 are switched into conduction so as to provide pulsating DC signals 52 and 54. These signals are applied to the DC amplifier A–3 which preferably includes a summing type DC amplifier for summing signals 52 and 54 and providing a full wave DC output signal. In addition, amplifier A–3 includes ripple filtering circuitry for smoothing the DC output signal prior to application to the output meter M.

Figure 3:
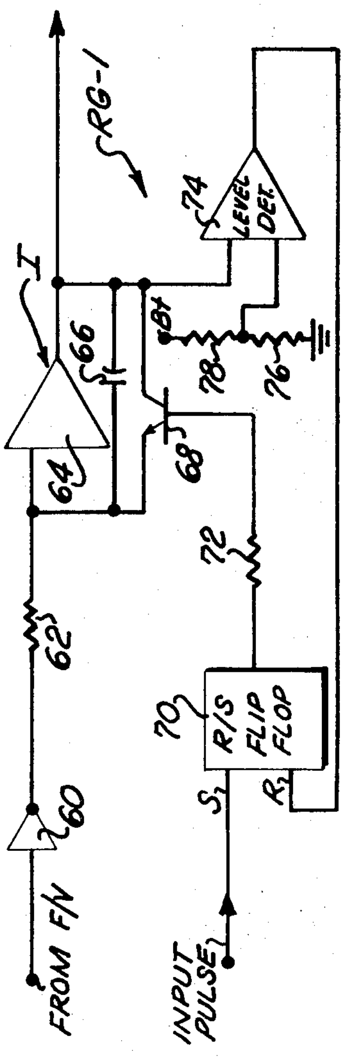

Ramp generator RG–1 and RG–2 preferably take the form as shown with respect to generator R6–1 in FIG. 3. This generator serves to receive output signal V from the frequency to voltage converter 22. The signal is inverted by an inverting amplifier 60 and applied through a resistor 62 to an integrating circuit I. The integrating circuit I includes an operational amplifier 64 having an input for receiving the signal from inverter amplifier 60 and a capacitor feedback path including an integrating capacitor 66. A switch in the form of an NPN transistor 68 is connected across capacitor 66. The base of transistor 68 is connected to the output of an R/S flip-flop 70 through a resistor 72. The output circuit of operational amplifier 64 is connected to one input of a comparator in the form of a level detector 74 having its second input connected to a voltage divider taking the form of a pair of series connected resistors 76 and 78 connected between ground and a B+ voltage supply source. The output of the level detector 74 is connected to the reset input R of flip-flop 70.

In operation, input pulses are applied to the set terminal S of flip-flop 70 and in the case of ramp generator RG–1 these input pulses are obtained from the output of the zero crossing detector 20. Each time an input pulse is received on the set terminal S the output circuit of flip-flop 72 provides a negative or reverse biasing signal to the base of transistor 68. Consequently, capacitor 66 commences to charge at a rate dependent upon the magnitude of voltage signal V which is proportional to the reference frequency. This is a positively increasing signal on the output of the integrator circuit I and is applied to the level detector 74. Resistors 76 and 78 of the voltage divider circuit are chosen to provide a threshold level L–2 which when crossed provides an output pulse from the level detector 74 to the reset terminal R of the flip-flop 70. Transistor 68 is then forward biased by a positive signal from the output of flip-flop 70 and capacitor 66 discharges. A cycle is commenced on the next input pulse applied to set terminal S of flip-flop 70. Ramp generator RG–2 operates in the same fashion as ramp generator RG–1 except that the trigger input pulses are received from level detector LD–1.

In practice, the threshold level L–2 of the level detector 74 may be set so that ramp generator RG–1 is reset at a point less than 360° after its commencement relative to the frequency signal. Thus, potentiometer 10 need not be in most cases adjusted over an entire 360° of phase displacement to obtain matching phase relationship between the driving signal pulses and the signal of interest. Consequently, ramp generator RG–1 may be reset prior to the point in time that a succeeding pulse P2, etc., is received.

From the foregoing description it is seen that the invention provides means for varying the phase relationship between the driving signals applied to the synchronous demodulator and the reference signal. The phase displacement obtained for a maximum DC output signal from meter M is visually indicated by the setting of the calibrated phase dial PD relative to pointer P. Thus, both the amplitude of the signal of interest and its phase displacement relative to the reference signal are provided. In addition, visual indication may be had as to the frequency of the reference signal.

Although the invention has been described in conjunction with a preferred embodiment it is to be appreciated that the invention is not limited to same, as various modifications in the circuit arrangement and parts employed may be made within the spirit and scope of the appended claims.

What is claimed is:

1. A driving circuit for a synchronous demodulator having first and second actuatable switching means to be alternately actuated by the driving circuit at a reference frequency for demodulating an AC signal containing noise and a signal of interest at said reference frequency and providing a DC output signal representative of said signal of interest wherein said driving circuit includes: means for receiving a reference signal exhibiting said reference frequency and providing first and second drive signals displaced in phase by 180° and at said reference frequency for alternately actuating said first and second switching means, respectively, and including means for varying the phase relationship between said drive signals and said reference signal independently of variations in the frequency of said reference signal; said phase varying means including means for providing a ramp signal which varies from a first level toward a second level at a frequency in synchronism with said reference frequency, means for providing an output signal pulse when said ramp signal attains a threshold level, and means for varying said threshold level to thereby vary the phase relationship between said output signal pulse and said reference signal.

2. A driving circuit as set forth in claim 1, including reference frequency measuring means for providing an output indication as to the frequency of said reference signal.

3. A driving circuit as set forth in claim 2, wherein said frequency measuring means includes a frequency to voltage conversion means for converting said reference signal into a DC level signal exhibiting a magnitude proportional to said reference frequency.

4. A driving circuit as set forth in claim 1, wherein said phase varying means includes means for providing a visual indication as to the phase relationship between said signal of interest and said reference signal.

5. A driving circuit as set forth in claim 1, including means for providing a second output signal pulse displaced in phase by 180° from said first output signal pulse.

6. A driving circuit as set forth in claim 5, including output means for providing said first and second driving signals in dependence upon said first and second output signal pulses.

7. A driving circuit as set forth in claim 4, wherein said visual indicating means includes a calibrated dial connected to said threshold varying means to provide a visual indication of the phase relationship between said driving signals and said reference signal and, hence, said signal of interest.

8. A driving circuit as set forth in claim 1, including means for controlling the slope of said ramp signal as a function of the frequency of said reference signal.

9. A driving circuit as set forth in claim 1 including means for providing a control signal dependent upon the frequency of said reference signal, and said ramp signal means being controlled by said control signal so that the slope of said ramp signal is dependent upon the reference frequency.

10. A driving circuit as set forth in claim 1 wherein said ramp signal providing means includes an integrating capacitor which charges at a rate dependent upon the magnitude of a control signal applied thereto, and means for providing a said control signal having a magnitude proportional to the reference frequency.

11. A driving circuit as set forth in claim 10, wherein said control signal providing means includes a frequency to voltage converter for providing an output voltage having a magnitude which varies proportional to said reference frequency.

12. A driving circuit as set forth in claim 10, wherein said ramp signal providing means is a linear ramp generator means.

13. A driving circuit as set forth in claim 10, wherein said ramp signal providing means includes actuatable switching means for, when actuated, connecting said integrating capacitor to receive said control signal so as to be charged at a rate dependent upon the magnitude of said control signal.

14. A driving circuit as set forth in claim 13, including means for actuating said actuatable switching means at a frequency in synchronism with said reference frequency.

* * * * *